United States Patent [19]

Wu

[11] Patent Number: 6,041,986

[45] Date of Patent: Mar. 28, 2000

[54] SCOREBOARD FOR ATTACHMENT TO A GOLF TROLLEY

[75] Inventor: Fang-Li Wu, Tainan Hsien, Taiwan

[73] Assignee: Sports World Enterprise Co., Ltd., Tainan Hsien, Taiwan

[21] Appl. No.: 09/275,099

[22] Filed: Mar. 24, 1999

[51] Int. Cl.[7] .................................................. B60R 9/00
[52] U.S. Cl. .......................... 224/274; 224/227; 224/545; 224/918
[58] Field of Search .................................. 224/274, 277, 224/420, 411, 545, 547, 548, 549, 564, 918

[56] References Cited

U.S. PATENT DOCUMENTS

| D. 176,627 | 1/1956 | Nash | D34/5 |
|---|---|---|---|
| 5,435,474 | 7/1995 | Lin | 224/274 |
| 5,848,742 | 12/1998 | Wang | 224/274 |

Primary Examiner—Gregory M. Vidovich
Assistant Examiner—Maerena W. Brevard
Attorney, Agent, or Firm—Rosenberg, Klein & Lee

[57] ABSTRACT

A scoreboard for attachment to a golf trolley comprises an adjustment member and a holding member. The holding member is pivoted on the adjustment member. An adjustable pulling rod is movably passed through the adjustment member and urged by a spring. The pulling rod has a pulling part and engaging protrusions spaced apart on a rod portion opposite the pulling part. The holding member has confining parts and confining gaps on bottom. When the engaging protrusions engage the confining gaps, the holding member is located on a not-in-use position. And when the protrusions engage the confining parts, the holding member is located on an in-use position where the holding member forms a proper angle with the supporting shaft of the trolley. The adjustable pulling rod is pulled from the pulling part for disengaging the protrusions, and for permitting the holding member to be pivoted on the adjustment member.

5 Claims, 5 Drawing Sheets

SCOREBOARD FOR ATTACHMENT TO A GOLF TROLLEY

BACKGROUND OF THE INVENTION

Golf trolleys are convenient for carrying golf clubs, balls etc. The golf trolleys can have scoreboards fixed to the supporting shaft or portions thereof for the golf players to score on the scoreboards.

A heretofore known scoreboard, referring to FIG. 5, is fixed to the supporting shaft 10 of a golf trolley, and it is right under the pushing handle 20. Paper can be placed on the scoreboard 30 for the golf player to score thereon.

However, it is found that the above said scoreboard has an undesirable feature; the scorekeepers or golf players have to squat down or bend their waiste to score on the scoreboard because when the golf trolley stands still on the ground, the scoreboard will stay substantially vertical. Consequently, the scorekeepers or golf players would have pains in the loins and back.

SUMMARY

It is an object of the present invention to provide a scoreboard for attachment to a golf trolley whereby the scorekeepers or golf players can socores thereon.

It is another object of the present invention to provide a scoreboard for attachement to a golf trolley, which can also hold pens, golf balls and tee pegs.

It is a main object of the present invention to provide a scoreboard for attachment to a golf trolley, which can be located between an in-use position and a not-in-use position. The scoreboard, when located in the in-use position, forms an angle with the supporting shaft of the golf trolley such that the scorekeepers can write thereon conveniently and comfortably without the need of squatting down.

The scoreboard of the present invention comprises an adjustment member and a holding member as the main parts. The adjustment member is fixed to the supporting shaft of the golf trolley, and has two side plates and an adjustable pulling rod passed through the side plates. The holding member is provided for holding paper, tee pegs, and pens etc and has two connecting plates on a bottom side thereof. The connecting plates are pivoted to the side plates of the adjustment member.

The adjustable pulling rod further has a pulling part for a user to pull therefrom to adjust the holding member, and has two engaging protrusions spaced apart on a rod portion opposite the pulling part. The adjustable pulling rod is urged by a spring associated therewith.

Each connecting plate of the holding member has a confining part, and a confining gap adjacent to the confining part. The engaging protrusions can each engage a respective one of the confining gaps and let the holding member in the not-in-use position where the holding member is substantially parallel to the supporting shaft. When the user pulls the adjustable pulling rod, the engaging protrusions will separate from the confining gaps for the holding member to be pivotable. Thus, the user can pivot the holding member to the in-use position where the holding member forms a proper angle with the shaft for the user to write thereon comfortably. The engaging protrusions will each engage a respective one of the confining parts of the holding member after the user release the adjustable pulling rod for same to be urged to the original position by the spring.

BRIEF DESCRIPTION OF TIE DRAWINGS

The present invention will be better understood by reference to the accompanying drawings, wherein.

DETAILED DESCRIPTION OF THE PREFERRED EMBODIMENTS

Figure 1:
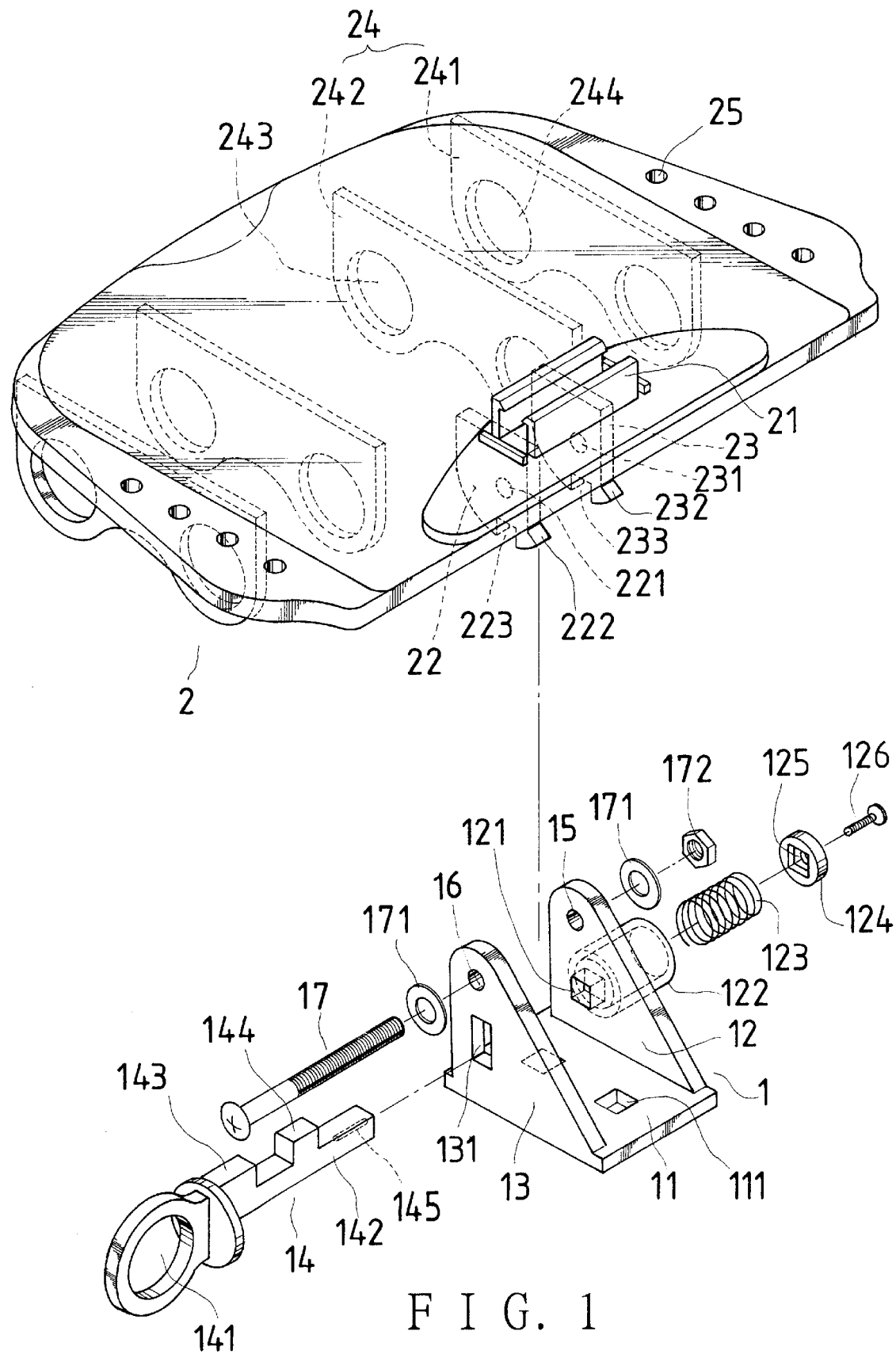
FIG. 1 is an exploded perspective view of a scoreboard for attachment to a golf trolley according to the present invention.
Figure 2:
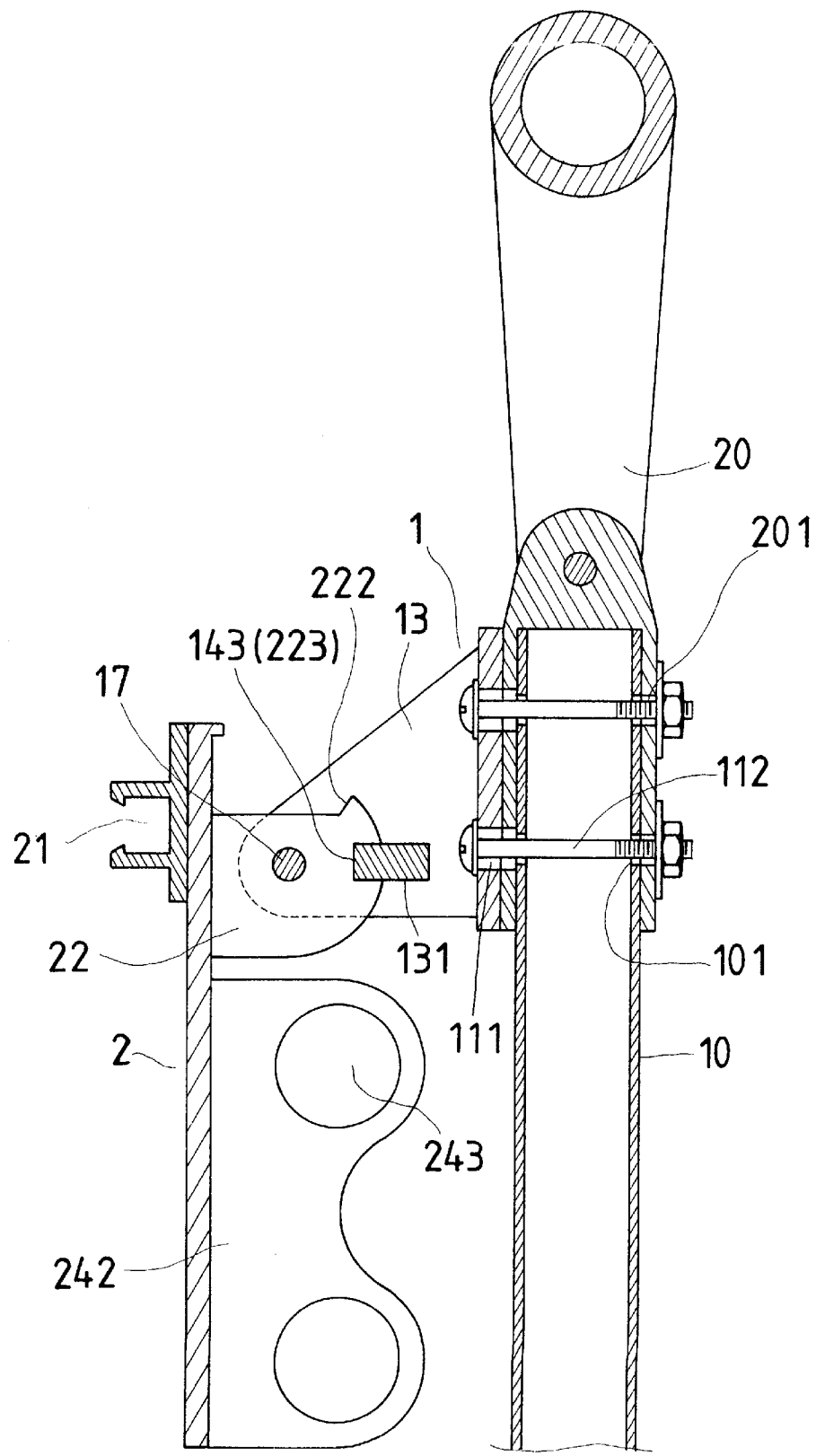
FIG. 2 is cross-sectional view of the scoreboard in FIG. 1.
Figure 3:
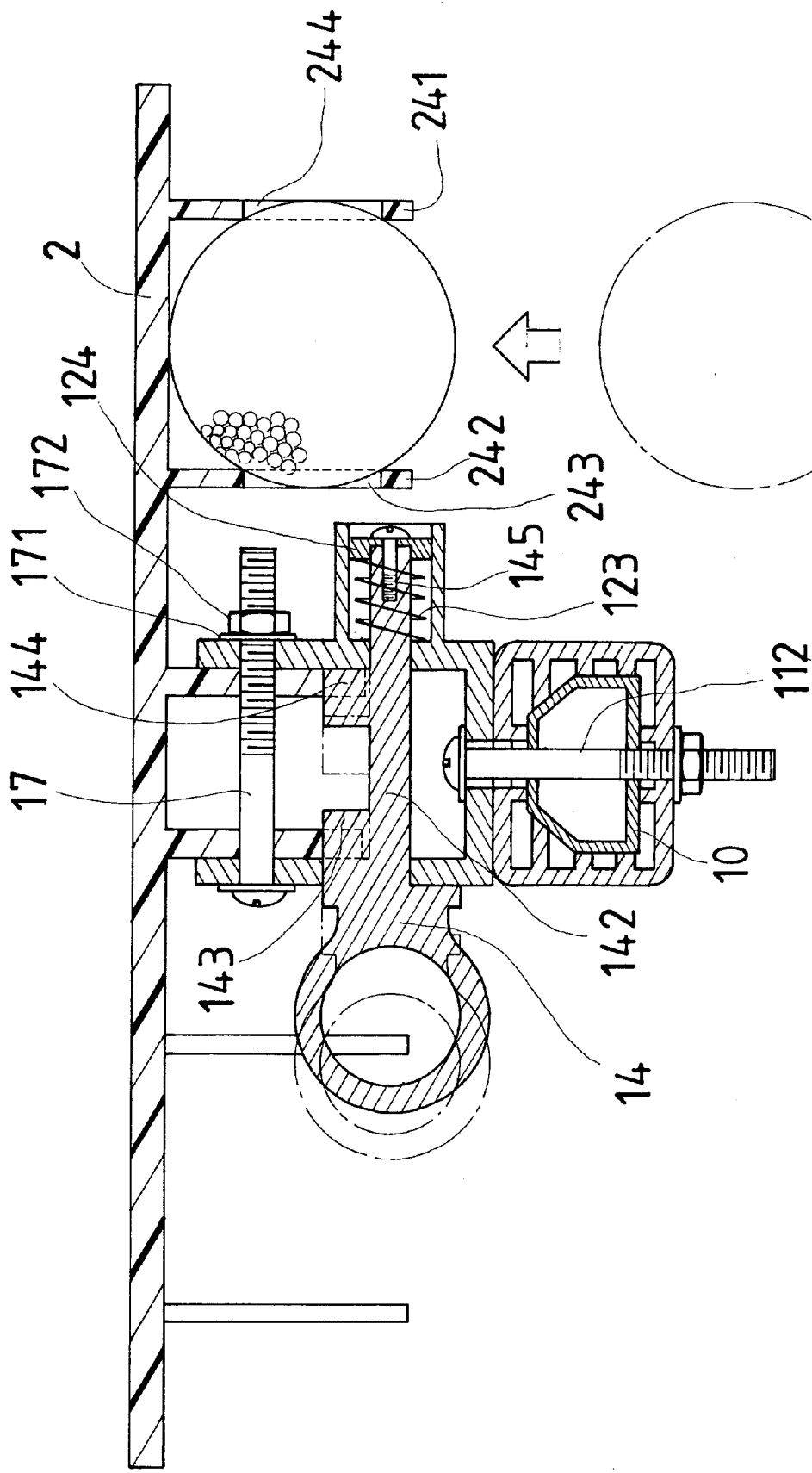
FIG. 3 is another cross-sectional view of the scoreboard in FIG. 1, with the adjustable pulling rod under movement.

Referring to FIGS. 1 and 2, a scoreboard for attachement to a golf trolley of the present invention comprises an adjustment member 1 and a holding member 2 as main parts.

The adjustment member 1 includes a base plate 11, an adjustable pulling rod 14 and side plates 12, 13. The base plate 11 has a plurality of through holes 111. Bolts 112 are used and passed through a respective one of the through holes 111 of the adjustment member 1 and holes 201 of a pushing handle 20 and holes 101 of a supporting shaft 10. Nuts (not numbered) are used to connect the bolts 112 and fix the adjustment member 1 to the supporting shaft 10 and the pushing handle 20.

The side plate 13 has a rectangular hole 131 and the side plate 12 has a square hole 121. The side plates 12, 13 each has holes 15, 16 respectively.

The adjustable pulling rod 14 includes a rod portion 142 and a pulling part 141. The rod portion 142 substantially has a square cross section, and has first and second engaging protrusions 143 and 144. The adjustable pulling rod 14 further has a tapped hole 145 at one end opposite the pulling part 141.

The side plate 12 further has a socket part 122 on outer side thereof, in open communication with the square hole 121. The rod portion 142 of the adjustable pulling rod 14 is passed through the rectangular hole 131, the square hole 121 and the socket part 122 in sequence with the square end received within the socket part 122. A spring 123 is received within the socket part 122, and confined by the side plate 12. A covering 124 is connected to the adjustable pulling rod 14 with a secrew 126 passed through a central hole 125 thereof, and screwed into the tapped hole 145 of the rod 14. Thus, the spring 123 is also confined by the covering 124 to urge the rod 14 toward the outer side of the side plate 12.

The holding member has two connecting plates 22 and 23 on a bottom thereof. Each of the plates 22 and 23 has a hole 221 and 231 respectively. The holding member 2 is pivoted to the adjustment member 1 by passing an elongated bolt 17 through the holes 16 and 15 of the adjustment member 1 and the holes 221 and 231 of the holding member 2. In addition, washers 171 and a nut 172 are used to finalize the connection of the elongated bolt 17.

Figure 4:
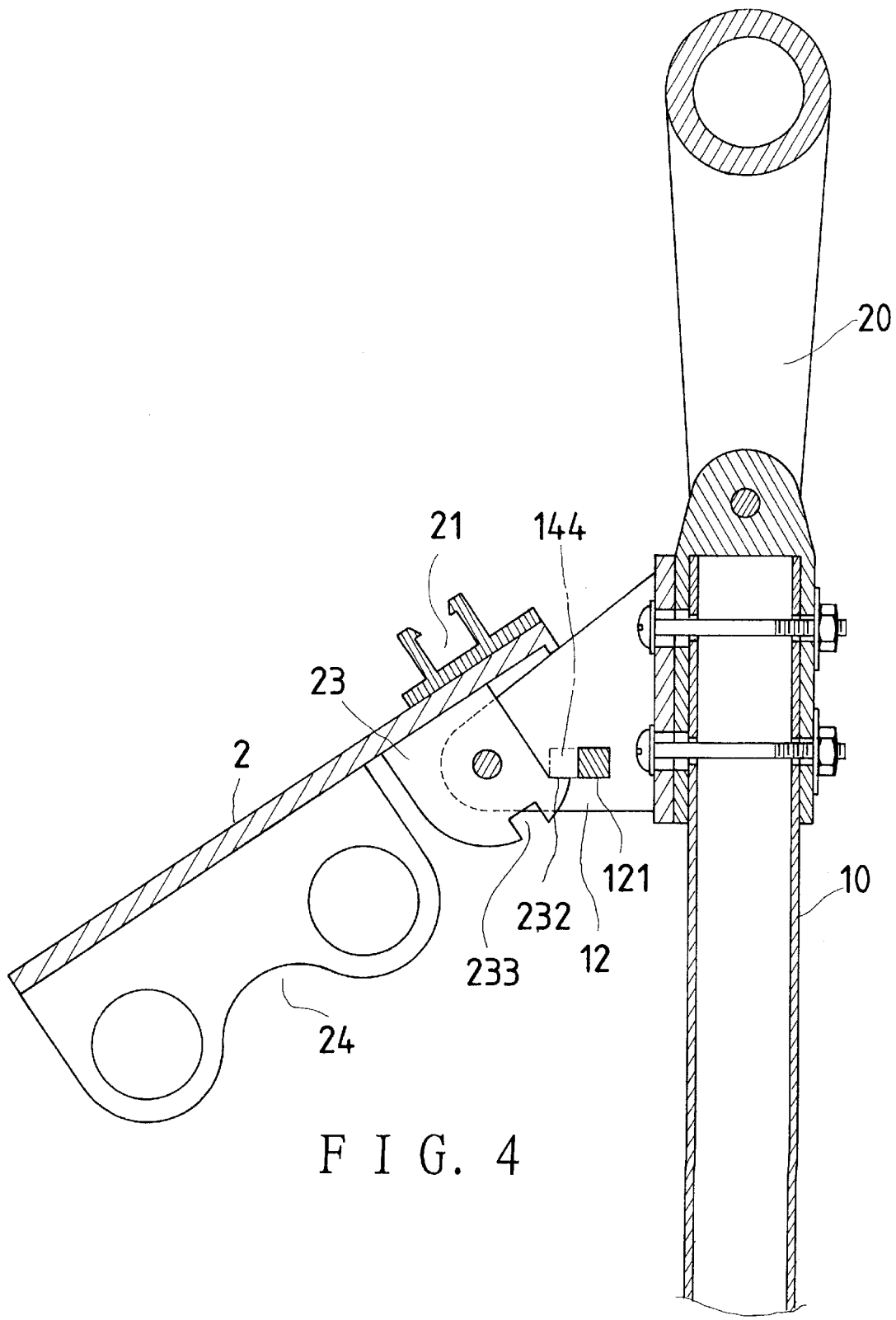
FIG. 4 is a view of the scoreboard of the present invention, attached to the golf trolley and located in the in-use position.
Figure 5:
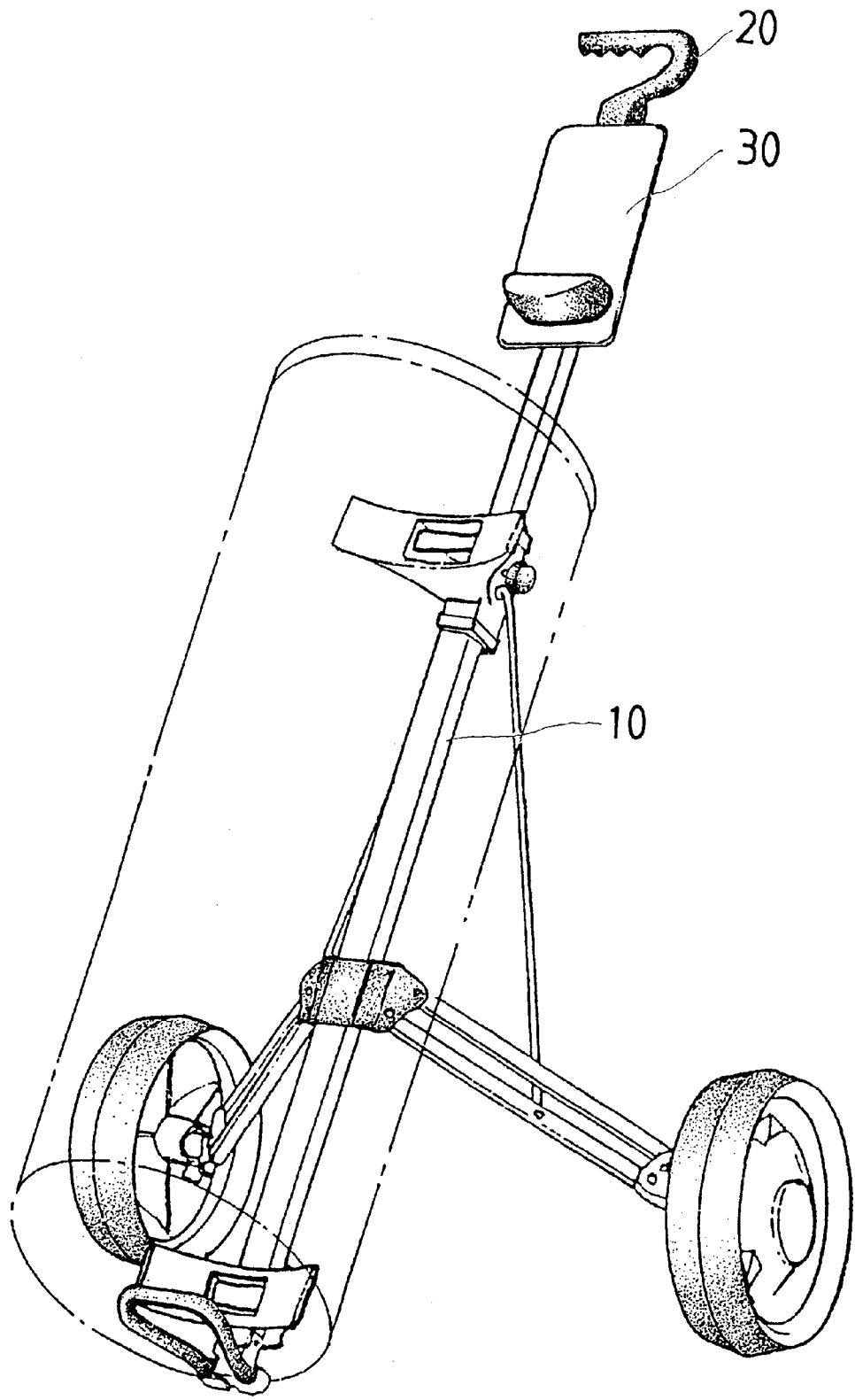
FIG. 5 is a perspective view of a golf trolley with a conventional scoreboard attached thereto.

Moreover, the connecting plates 22 and 23 each has a confining part 222, 232 respectively, and a confining gap 223, 233 respectively. Referring to FIGS. 2 and 4, the holding member 2 can be pivoted between a first position (FIG. 2), and a second position (FIG. 4). When the scoreboard is not in use, the holding member 2 is located at the first position where the first and the second engaging protrusions 143, 144 of the adjustable pulling rod 14 each engage the confining gaps 223 and 233 of the holding member 2 respectively. When the rod 14 is pulled away from the side plate 12, the engaging protrusions 143 and 144 no longer engage the confining gaps 223 and 233, permitting the holding member 2 to be pivoted from the first position to the second position. The engaging protrusions 143 and 144 will engage the confining parts 222 and 232 respectively when the rod 14 is released by the user, and urged by the spring 123 to move further into the socket part 122. Thus, the adjustment member 1 supports the holding member 2 in a position that is convenient for writing thereon. Similarly, the rod 14 can be pulled for permitting the holding member 2 to be pivoted from the second position to the first position.

Moreover, the holding member 2 has a penholder 21 on an upper side thereof, a plurality of tee holding holes 25, and ball holding parts 24 on the bottom of the holding member 2. The ball holding parts 24 include ball holding plates 241, 242 which have ball holding holes 243, and are spaced apart such that a golf ball can be held between two adjacent opposing holes 243. Each of the holes 243 has a smaller diameter than the golf ball. The penholder 21 can hold a pen therein. The user can place a paper on the upper side of the holding member 2 to score, and place tee pegs into the tee holding holes 25.

From the above description, it can be understood that the scoreboard for attachment to a golf trolley of the present invention has a desirable feature. The holding member 2 can be pivoted between the not-in-use position, and the in-use position where the scorekeepers or the golf players can write on the scoreboard conveniently and comfortably.

What is claimed is:

1. A scoreboard for attachment to a golf trolley comprising
   (a) an adjustment member adapted to be fixed to a supporting shaft of said trolley, said adjustment member including
      (i) a first side plate on a first side thereof;
      (ii) a second side plate on a second side thereof;
      (iii) an adjustable pulling rod having a pulling part portion and a rod portion, said rod portion having a first and a second engaging protrusion, said rod portion being lengthwise movably passed through said first and second side plates;
      (iv) a socket part on an outer side of said second plate, said socket part receiving at least a part of said pulling part portion, and a spring being associated with said rod portion in order to urge said adjustable pulling rod toward said socket part;
   (b) a holding member including
      (i) a first connecting plate on a bottom thereof, said connecting plate having a confining part and a confining gap;
      (ii) a second connecting plate on said bottom, said second confining plate having a confining part and a confining gap, said first and second connecting plate being pivotally connected to a respective one of said side plates of said adjustmemt member for said holding member to be pivotable on said adjustment member between an in-use position and a not-in-use position; said first and second engaging protrusions being engageable with a respective one of said confining gaps of said holding member to locate said holding member when said holding member is pivoted to said not-in-use position, and said adjustable pulling rod is urged toward said socket part by said spring; said engaging protrusions being separable from said confining gaps when said adjustable pulling rod is pulled on said pulling part away from said socket part in order for said holding member to be pivotable; said engaging protrusions being engageable with said confining parts of said holding member for same to be located in said in-use position.

2. The scoreboard for attachment to a golf trolley as claimed in claim 1, wherein said rod portion of said adjustable pulling rod has square cross-section, and said first and second side plates have rectangular and square holes respectively for said adjustable pulling rod to be passed therethrough.

3. The scoreboard for attachment to a golf trolley as claimed in claim 1, wherein said holding member has a plurality of spaced apart ball holding plates coupled to said bottom thereof, said ball holding plates each having a plurality of ball holding holes for holding a golf ball between two adjacent opposing holes of said ball holding holes.

4. The scoreboard for attachment to a golf trolley as claimed in claim 1, wherein said holding member has a plurality of tee holding holes on two sides thereof.

5. The scoreboard for attachment to a golf trolley as claimed in claim 1, wherein said holding member has a penholder thereon.

* * * * *